United States Patent [19]
Kooiker

[11] Patent Number: 5,931,521
[45] Date of Patent: Aug. 3, 1999

[54] FOLDING COVER FOR PICKUP TRUCK BED

[76] Inventor: John Kooiker, 3257 68th St., Dutton, Mich. 49316

[21] Appl. No.: 08/888,685

[22] Filed: Jul. 7, 1997

Related U.S. Application Data

[60] Provisional application No. 60/047,895, May 29, 1997.

[51] Int. Cl.⁶ ........................................................ B60P 7/08
[52] U.S. Cl. ........................................................ 296/100.09
[58] Field of Search .................... 296/100.09, 100.04, 296/100.07; 292/DIG. 43

[56] References Cited

U.S. PATENT DOCUMENTS

| | | | |
|---|---|---|---|
| 4,861,092 | 8/1989 | Bogard | 296/100.09 |
| 5,636,893 | 6/1997 | Wheatley et al. | 296/100.07 |
| 5,653,491 | 8/1997 | Steffens et al. | 296/100.09 |

*Primary Examiner*—Gary C. Hoge
*Attorney, Agent, or Firm*—John A. Waters; Waters & Morse, P.C.

[57] ABSTRACT

A folding cover for a pickup truck bed includes an improved adjustable front hinge support for mounting the cover that permits the front panel to be opened and permits lateral, vertical, and longitudinal adjustment of the cover position. A wire spring latch fastens the front panel in a closed position and provides for vertical latch position adjustment. A rear panel side latch is opened with a depressible latch opener at the rear of the cover. An intermediate panel latch fastens the intermediate panels down at the side of the pickup truck bed. These latches release automatically when the cover is folded. Another intermediate panel side latch has a wire spring pin that can be manually or automatically disengaged. The cover also has wind deflecting sloped side edges integral with the panel frame and hinges integral with the panel frame. Novel seals seal the junctions between adjacent panels.

1 Claim, 10 Drawing Sheets

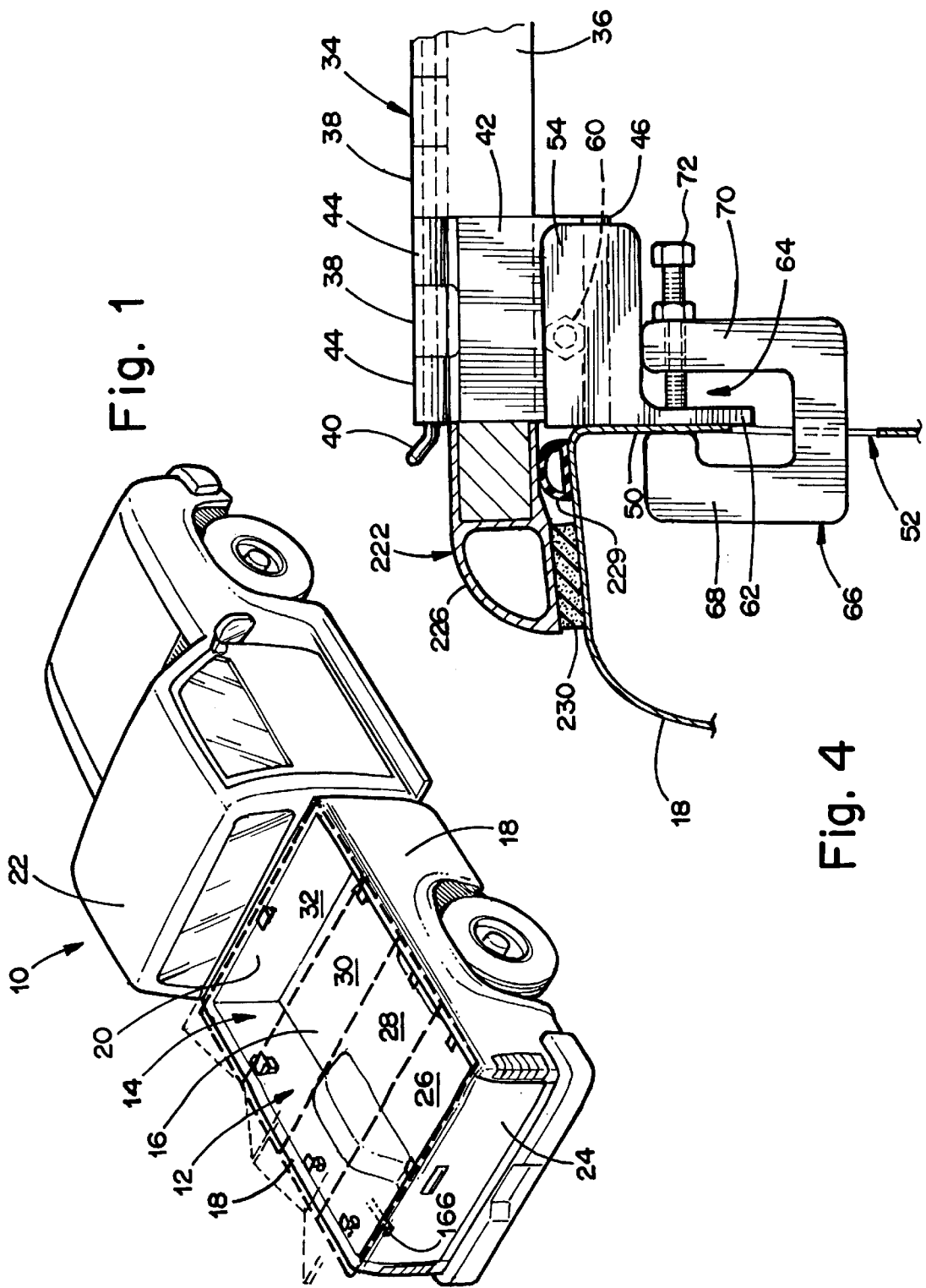

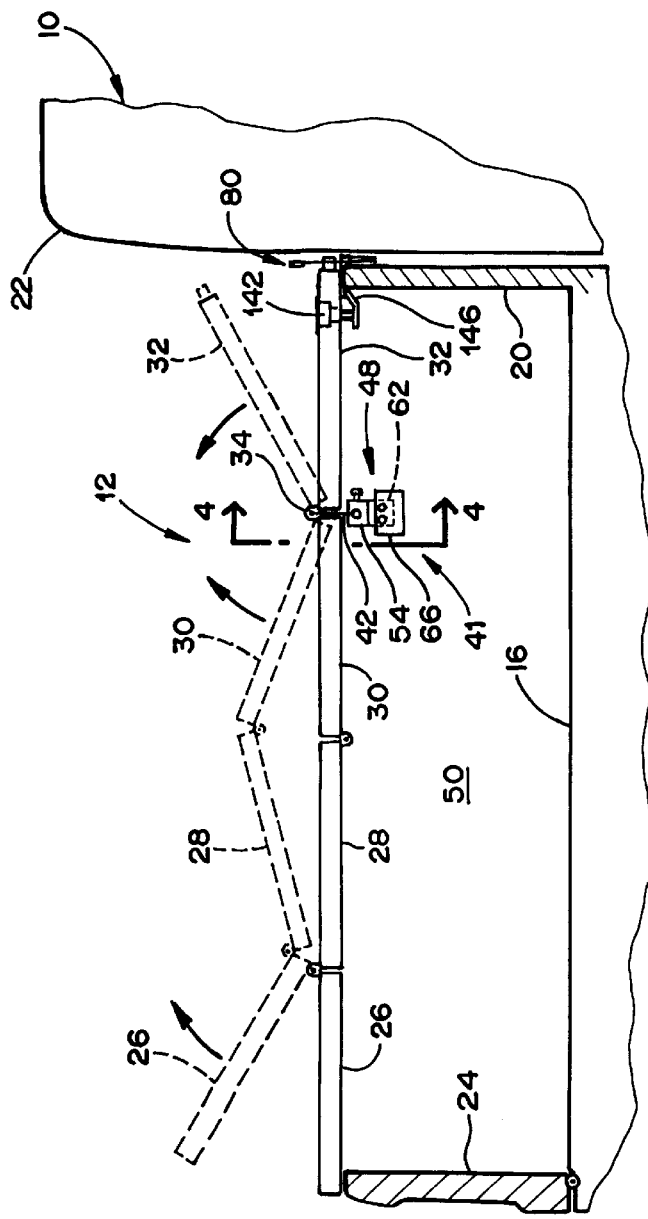
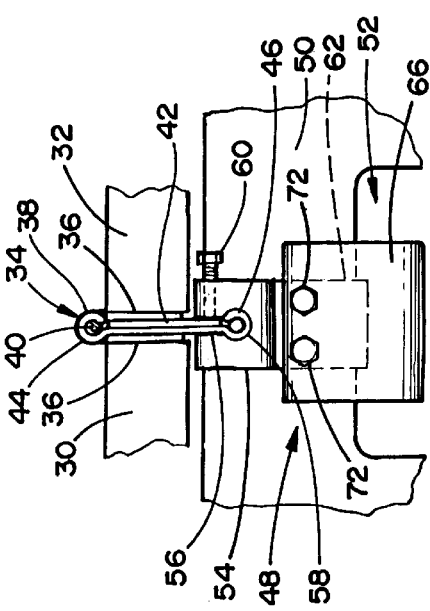

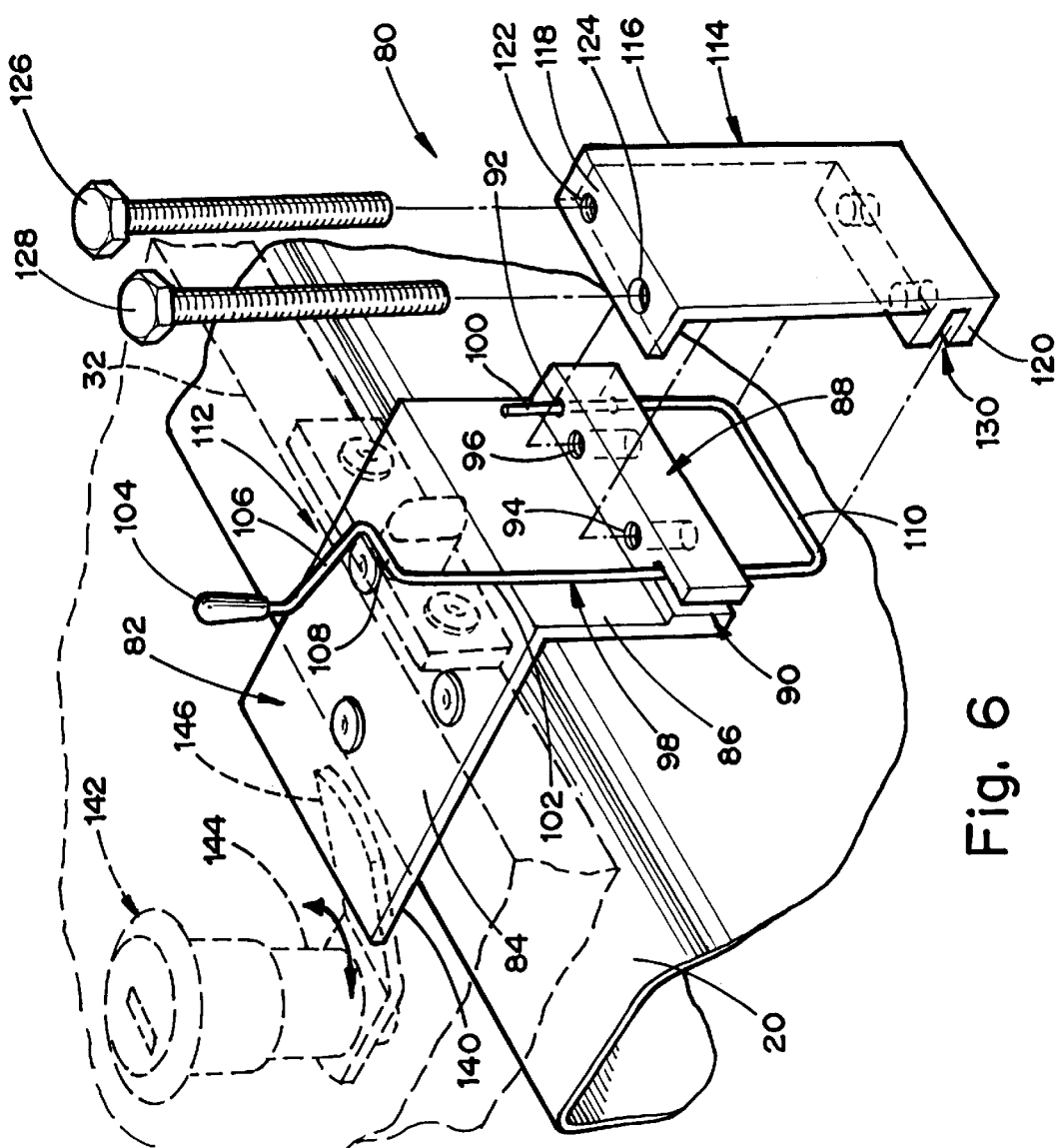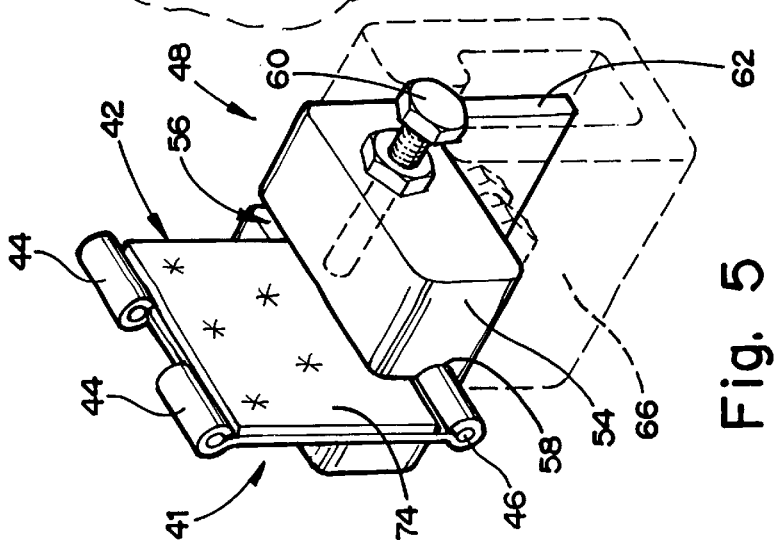

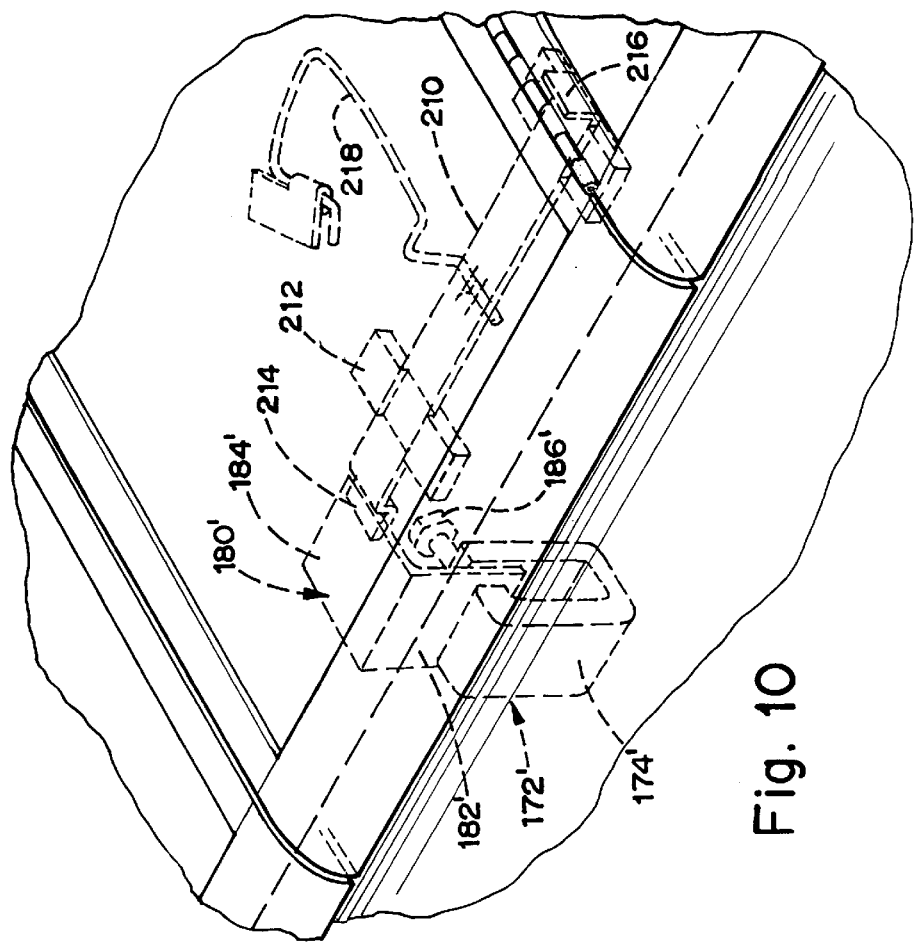
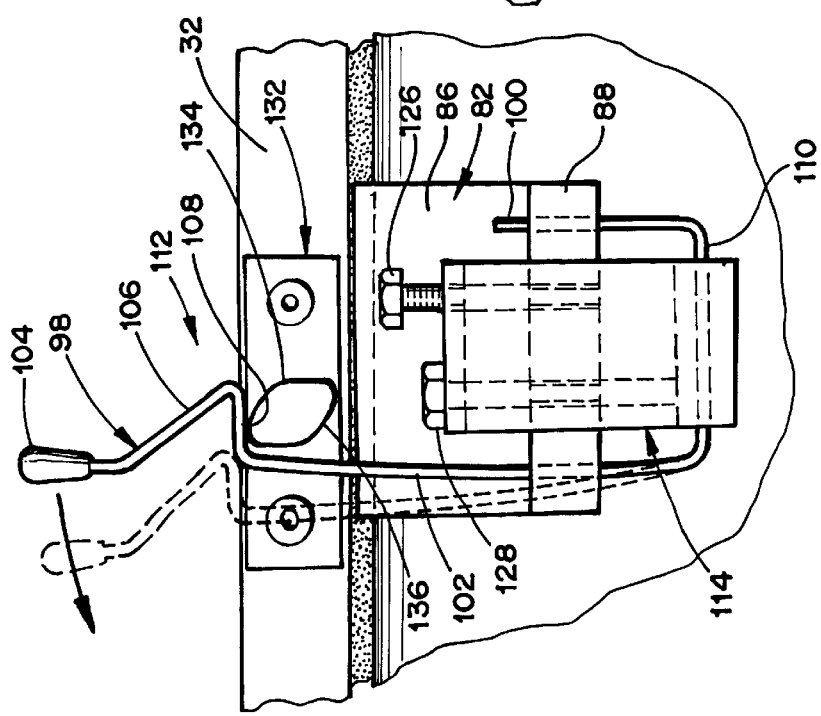

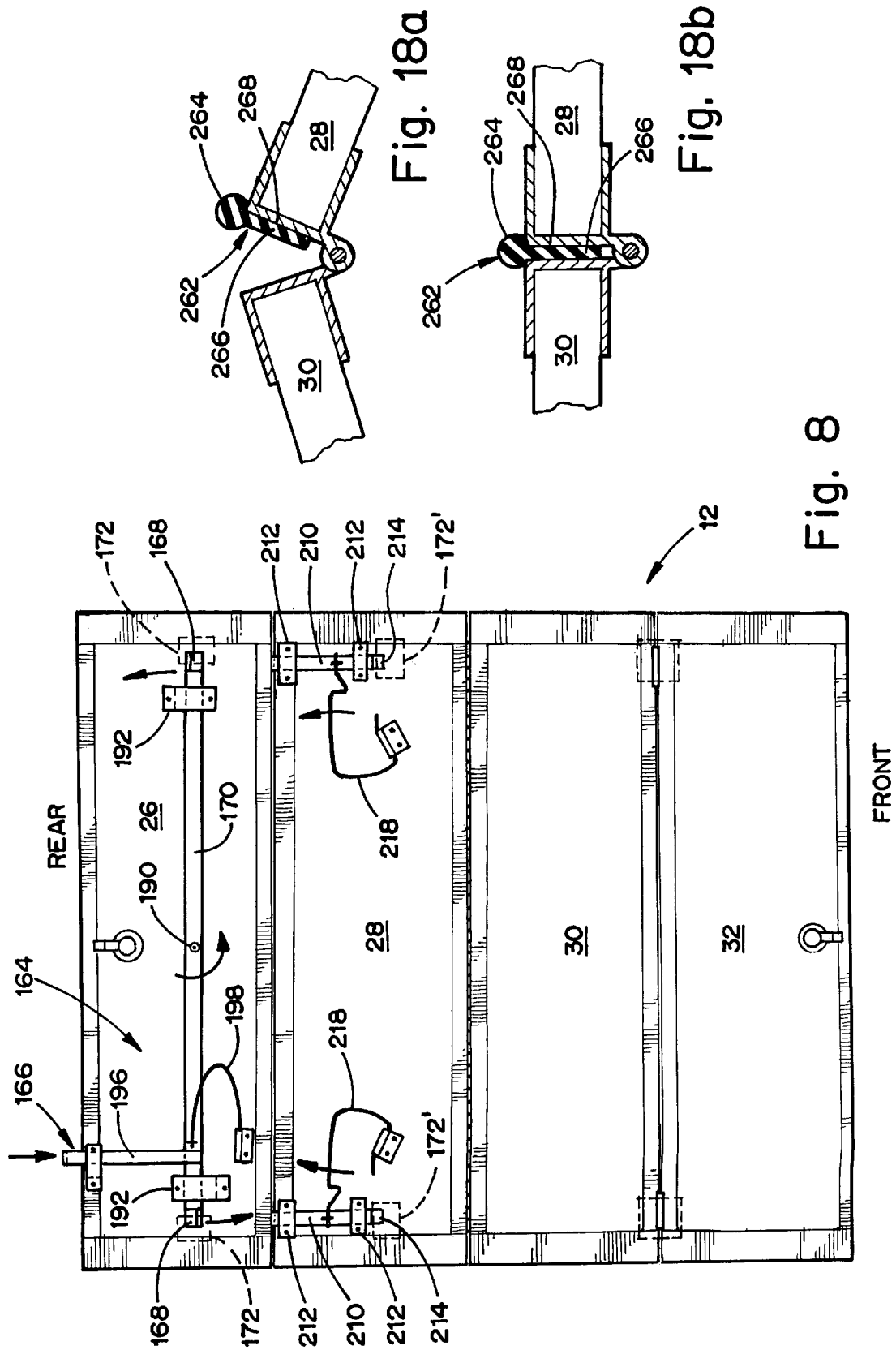

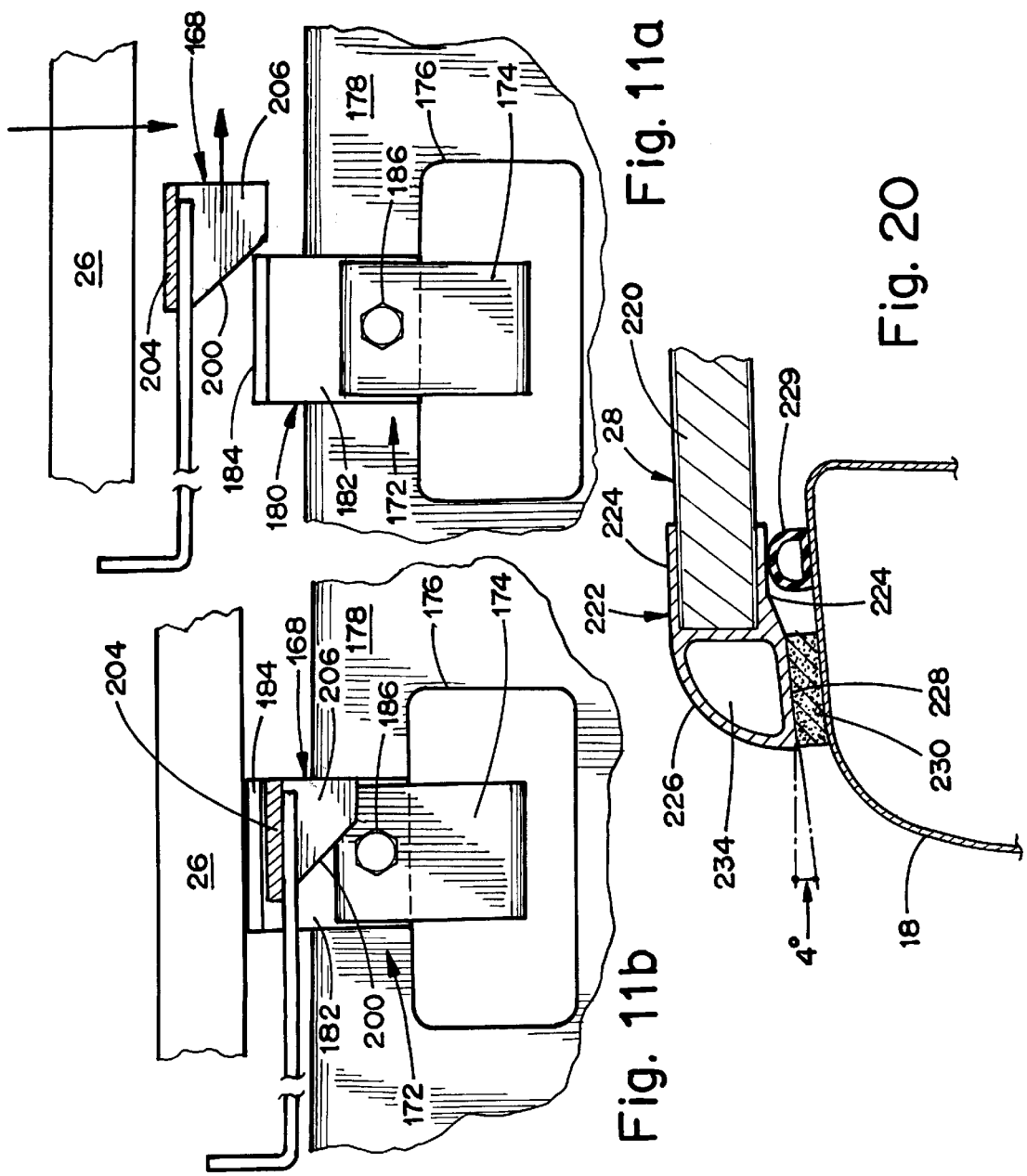

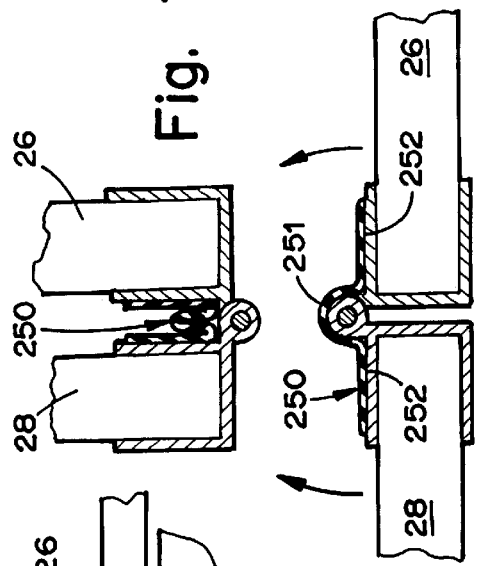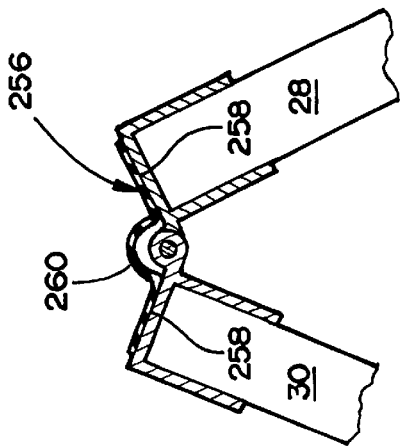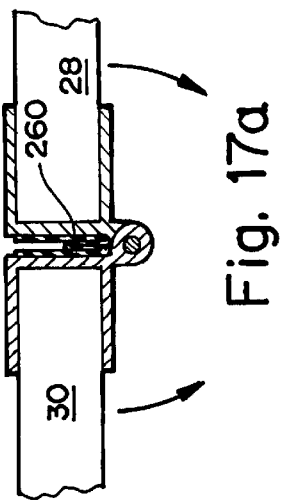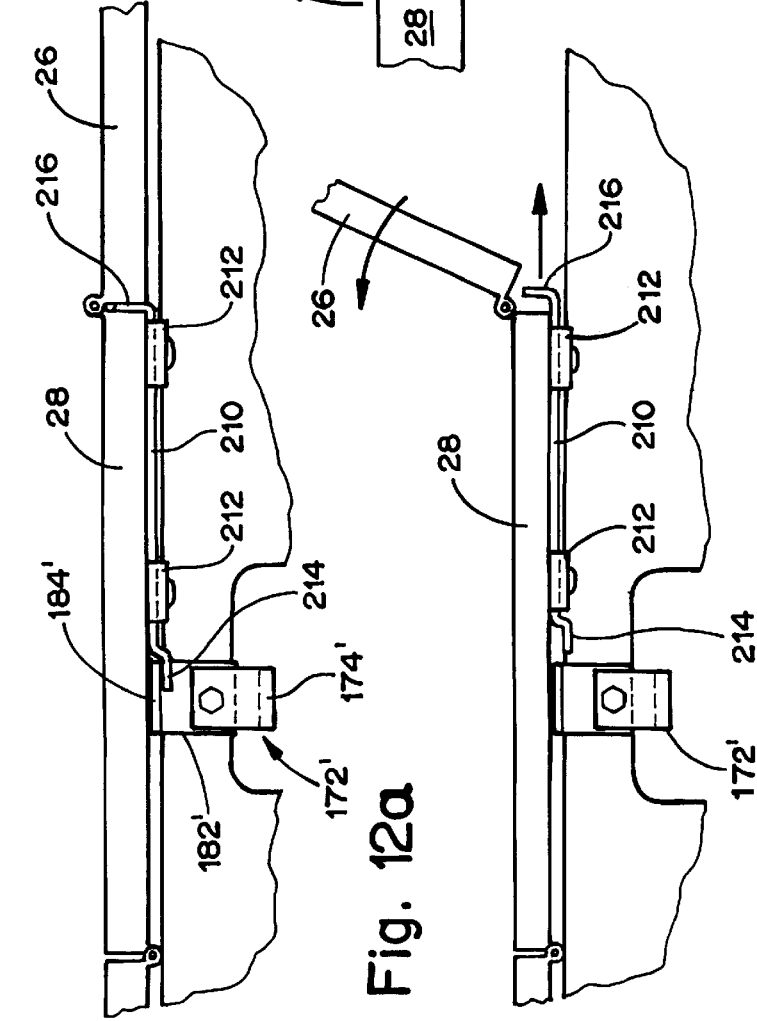

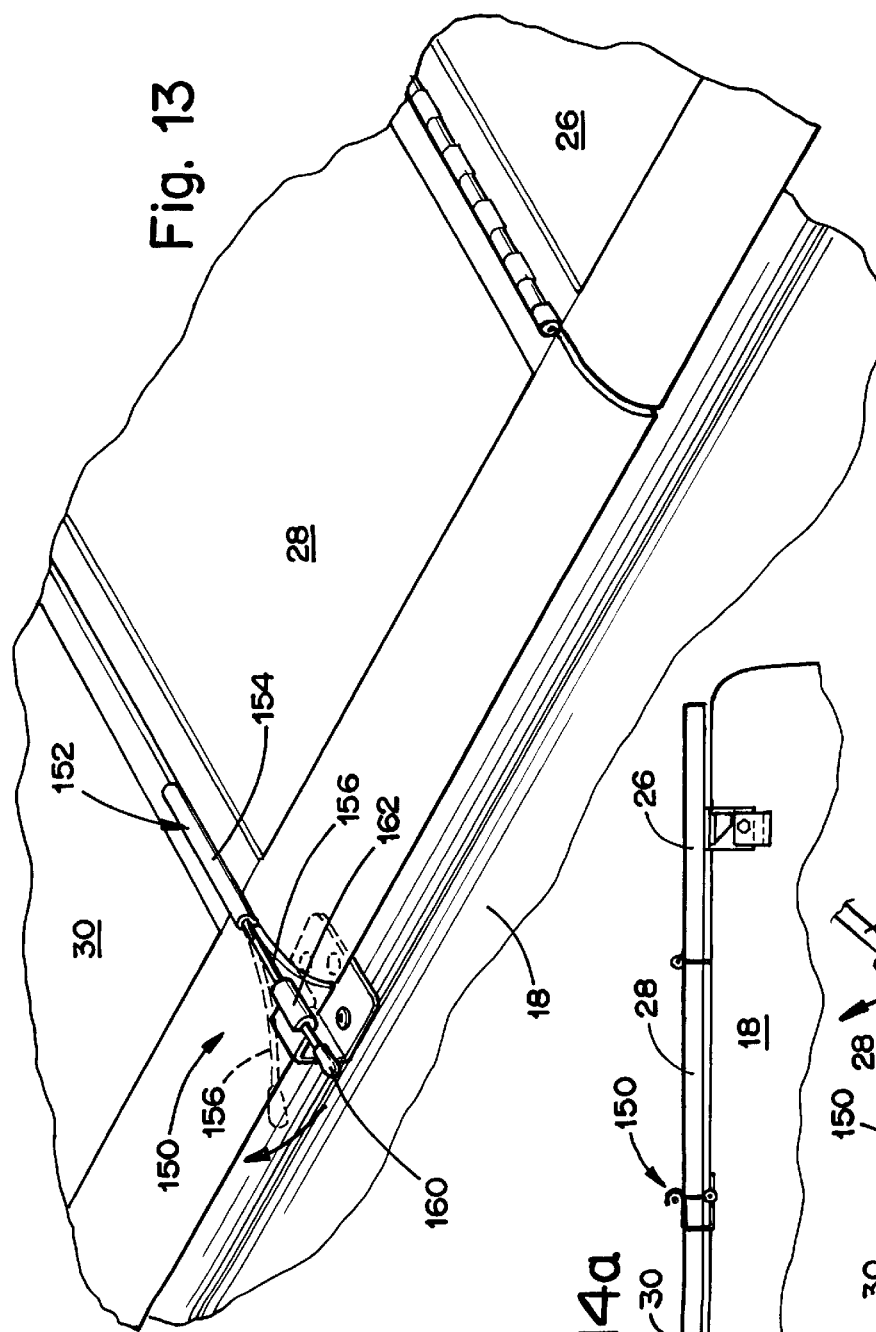

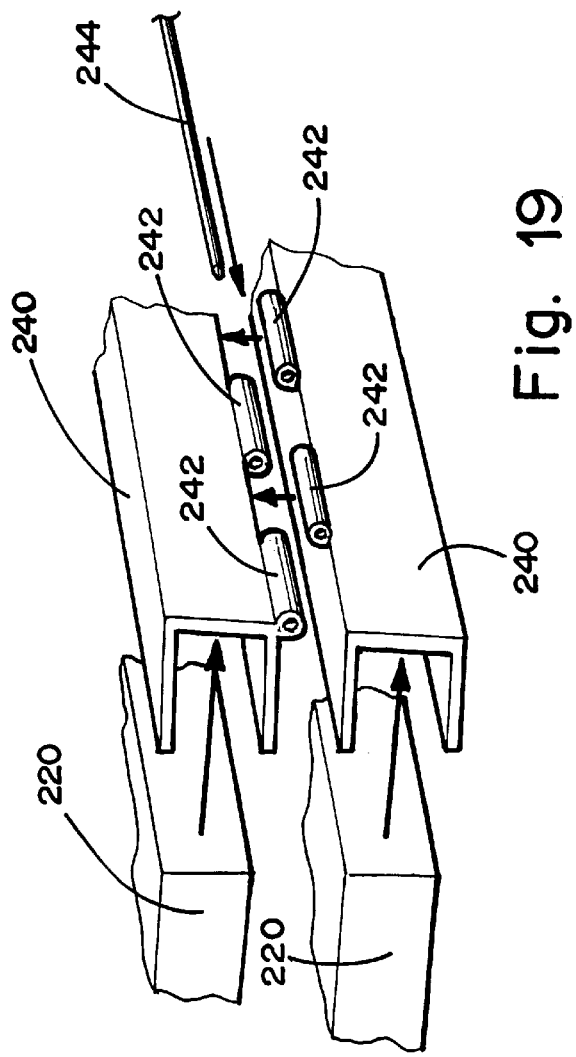
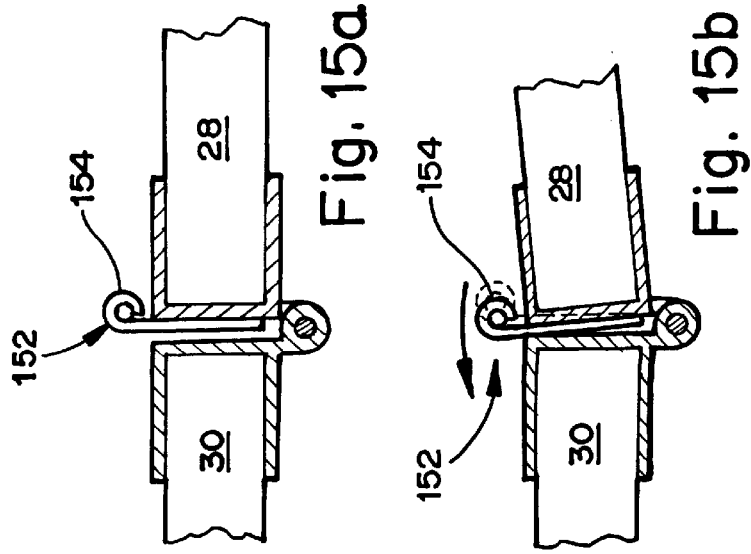

FOLDING COVER FOR PICKUP TRUCK BED

CROSS-REFERENCES TO RELATED APPLICATIONS

This application is a continuation of applicant's co-pending provisional application Ser. No. 60/047,895, filed May 29, 1997.

STATEMENT REGARDING FEDERALLY SPONSORED RESEARCH OR DEVELOPMENT

Not Applicable.

FIELD OF THE INVENTION

The present invention relates to a folding cover for a pickup truck bed employing improved latching, sealing, attachment, and construction features.

BACKGROUND OF THE INVENTION

A number of folding covers have been developed for covering pickup truck beds. Applicant's prior U.S. Pat. Nos. 4,844,531 and 4,946,217 (which are incorporated by reference) disclose the general construction and operation of such products. In these products, the front panel, or the panel closest to the cab of the pickup truck, is usually fastened down securely and serves as an anchor for the remaining panels of the cover. The disadvantage with this construction is that the front panel cannot be moved for access purposes. Applicant's co-pending patent application Ser. No. 08/528,943, discloses a cover wherein the front panel can be opened.

An object of the present invention is to provide an improved front latch mechanism and hinge mechanism for a front opening panel, to provide improved latch mechanisms for holding down the remaining panels, and to provide improved construction and attachment mechanisms for a folding cover for a pickup truck bed.

BRIEF SUMMARY OF THE INVENTION

In accordance with one aspect of the present invention, an improved front latch mechanism is for a pickup truck bed cover comprises a cam-actuated wire spring latch that attaches by an adjustable attachment mechanism to the front of a pickup truck bed and extends upwardly to engage a projection on the front of the front panel member. The latch engages automatically when the front panel is closed, and the front panel can be opened easily by simply pivoting the spring wire latch member to the side. An adjustable mounting mechanism for the spring wire latch permits vertical adjustment of the latch for proper engagement with the projection on the front edge of the front panel.

In another aspect of the present invention, an improved hinge-mounting mechanism is employed for attaching the front hinge of a folding panel cover to the inside surface of the pickup truck bed. The improved mechanism clamps easily to the inside of the pickup truck bed and permits easy vertical and lateral adjustment of the panel mounting mechanism.

In another aspect of the invention, the junctions between intermediate panels of the cover are fastened down on the pickup truck bed by means of a transverse wire spring that engages a C-shaped clip mounted to the outside of the pickup truck bed adjacent the junction. The wire clip can be disengaged by manipulating the wire out of the C-shaped clip or by simply folding the panel cover.

In another aspect of the present invention, a latch for holding the rear panel down on the truck bed sidewalls is mounted on the underside of the rear panel and on the inside upper edges of the truck bed sidewalls. The latch is actuated by depressing a spring return plunger at the rear edge of the panel.

In another aspect of the invention, a similar latch mechanism is employed for holding intermediate panels down on the truck bed sidewalls. These panels are automatically latched when the cover is closed and automatically unlatched when the cover is opened.

In another aspect of the invention, the construction of the hinged panels themselves is improved by incorporating the hinge as an integral component of a C-shaped channel that forms the frame for the panel. This construction does away with the necessity for separately attaching a hinge to each panel and further reduces the likelihood that the hinges will come loose or that the panels will leak.

In another aspect of the invention, a seal for the panel junctions wherein the hinge pin is adjacent the lower sides of the panels comprise a transverse seal member having a round bead on the top and a more narrow leg extending downwardly therefrom. The leg fits between the adjacent panels and is adhesively connected to one panel edge. The bead is positioned so as to fit over the gap between the panels and seal the gap from moisture penetration.

These and other features of the present invention are shown in the attached drawings and described in detail below.

BRIEF DESCRIPTION OF THE SEVERAL VIEWS OF THE DRAWING

FIG. 1 is a perspective view of a pickup truck employing the cover of the present invention.

FIG. 2 is a sectional side elevational view of the truck and cover of FIG. 1.

FIG. 3 is an enlarged fragmentary view of the cover hinge mounting mechanism of FIG. 2.

FIG. 4 is a sectional view taken along line 4—4 of FIG. 2.

FIG. 5 is a perspective view of the hinge mounting mechanism shown in FIGS. 3 and 4.

FIG. 6 is and exploded perspective view of the front panel latch mechanism of the present invention.

FIG. 7 is a front elevational view of the front panel latch mechanism.

FIG. 8 is a plan view of the underside of the pickup truck bed cover of the present invention, showing an undercover side latch mechanism.

FIG. 10 is a fragmentary perspective view showing the middle panel undercover latch mechanism of FIG. 8.

FIGS. 11a and 11b are fragmentary sectional side elevational views of the rear panel latch mechanism of FIG. 8.

FIGS. 12a and 12b are side elevational views of the middle panel latch mechanism of FIG. 8.

FIG. 13 is a perspective view of a second embodiment of a middle panel side latch mechanism.

FIGS. 14a and 14b are side elevational views showing the manner in which the side latch mechanism of FIG. 13 is released by lifting the panels.

FIGS. 15a and 15b are enlarged views of the side latch mechanisms of FIGS. 14a and 14b.

FIGS. 16a and 16b are sectional side views of a hinge seal for the hinges with the hinge pin at the top of the panel.

FIGS. 17a and 17b are sectional side views of a hinge seal for the hinges with the hinge pin at the bottom of the panel.

FIGS. 18a and 18b are sectional side views of an alternative embodiment of a hinge seal for the hinges with the hinge pin at the bottom of the panel.

FIG. 19 is an exploded perspective view of the integral extruded frame and hinge of the present invention.

FIG. 20 is a sectional view of the panel side frame positioned on the sidewall of a pickup truck.

DETAILED DESCRIPTION OF THE INVENTION

Figure 9:
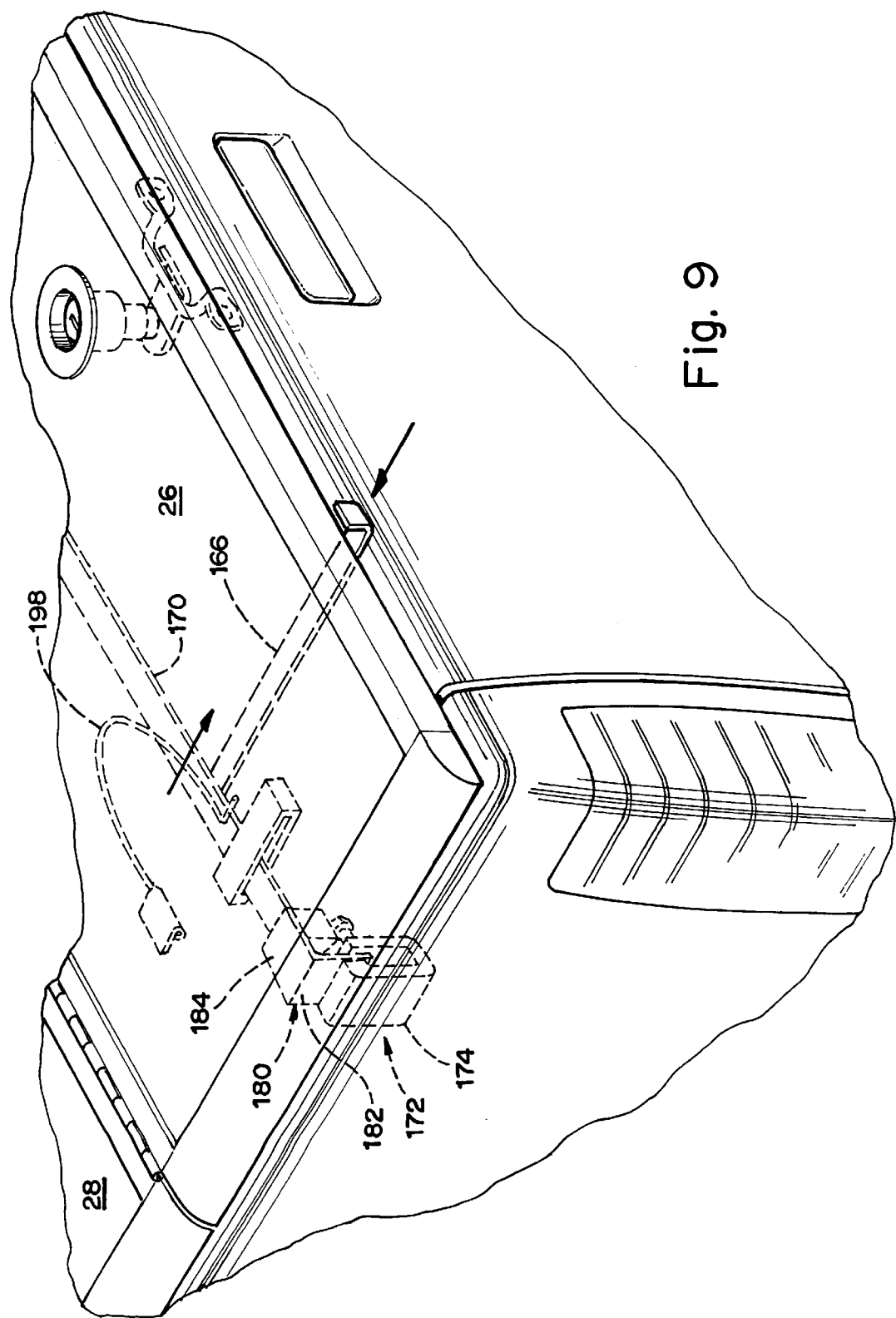
FIG. 9 is a fragmentary perspective view showing the rear panel undercover latch mechanism of FIG. 8.

Referring now to the drawings, a pickup truck 10 is shown in FIG. 1 with the folding cover 12 mounted over the cargo bay or bed 14 of the pickup truck. The bed has a floor 16, sidewalls 18 and a front wall 20 which is spaced slightly behind the rear of cab 22 of the pickup truck. A tailgate 24 is mounted on the rear of the bed and pivots downwardly or outwardly.

Cover 12 comprises four longitudinally spaced panels 26, 28, 30 and 32, with panel 32 being the front panel and panel 26 being the rear panel. The panels are connected by hinges that permit the cover to be folded in accordion fashion.

The manner in which the front two panels 30 and 32 are mounted to the sidewalls of the pickup truck bed is shown in FIGS. 2–5. Panels 30 and 32 are connected together by hinge 34, with each leaf 36 of the hinge being attached to an edge of one of the panels. The hinge can be a conventional piano-type hinge that extends the width of the cover, with the flat portion of each leaf being attached to the edge of the panel and alternating tubular portions 38 fitting together end-to-end and being interconnected by a hinge pin 40.

In the present invention, hinge support plate 42 is a flat plate having a pair of longitudinally spaced hinge tubes 44 mounted on one side and having an elongated tubular or cylindrical bead 46 on the other side. The hinge tubes 44 (there may be one or more) fit into hinge 34 in place of one or more corresponding hinge tubes 38, that are removed from one or more of the hinge leaves. Thus, hinge support plate 42 is pivotally mounted on the hinge by hinge pin 40 just as if it were part of the hinge. Hinge support plate 42 extends downwardly below the panels, and the bead 46 on the lower end is clamped into mounting mechanism 48, which is in turn attached to inner sidewall 50 of the pickup truck bed through an opening 52 in the inner sidewall.

Mounting mechanism 48 comprises a mounting block 54, which has a slot 56 extending downwardly from the top, with a rounded enlarged portion 58 at the bottom. The lower end of the hinge support plate fits in this slot, with bead 46 fitting into enlarged portion 58 and being restrained by the restricted portion of the slot above from upward movement. The hinge support plate, however, can slide transversely in the slot so that the position of the panel can be adjusted as desired in a transverse direction on the pickup truck bed. When the proper transverse position is achieved, a set screw 60 can attach the hinge support plate rigidly in position in the mounting block.

The mounting block itself has a downwardly extending flange 62 on a side thereof positioned adjacent the inner sidewall 50 of the truck bed. Flange 62 fits in an opening 64 and a U-shaped mounting member 66, with one leg 68 of the mounting member being positioned inside inner sidewall 50 and another leg 70 of the U-shaped mounting member being positioned outside of the wall. Set screws 72 can be tightened to lock flange 62 inside the mounting member.

In the illustrated embodiment, hinge support plate 42 is formed of a single flat piece of sheet metal, with the hinge tubes and bead being formed by bending the upper and lower ends of the plate to form a hollow, round shape. A spacer plate 74 is mounted on the intermediate portion 76 of the hinge support plate for reinforcement purposes and to serve as a spacer for maintaining the desired spaced relationship of the two hinged leaves when the hinge is closed. Other materials, such as plastics, and other manufacturing methods, such as extrusion or molding, could be used to fabricate the hinge support plates.

In order to mount a panel using this panel mounting mechanism 41, hinge support plates are first inserted in the hinge at a position that will place the mounting plates adjacent the inner sidewalls of the truck bed. Mounting blocks 54 are then slid on the lower ends of the hinge support plates. The panel is then placed on the truck bed and the mounting blocks slid outwardly until they abut the inner sidewalls of the truck bed. U-shaped mounting members 66 are then fitted upwardly through opening 52 so that inner sidewall 50 and flange 62 fit between legs 68 and 70 of the mounting member. The set screws 72 are then tightened to clamp the flanges and mounting blocks in a fixed position against the inner sidewall. The sideways position of the panels can be adjusted and then the panels can be locked in position by tightening set screws 60.

With the panel mounting mechanism formed in this manner, the panels can be easily mounted and dismounted from the truck bed, and the positions of the panels can be adjusted easily for proper fit and alignment.

An improved front latch assembly 80 for releasably securing the front edge of panel 32 to the front wall 20 of the truck bed is shown in FIGS. 6 and 7. Latch mechanism 80 comprises an L-shaped mounting plate 82, with an upper horizontal leg 84 being riveted or otherwise fastened to an upper edge of front wall 20. Right angle leg 86 of the mounting plate extends downwardly adjacent the front edge of front wall 20. At the bottom of vertical leg 86, a mounting block 88 extends outwardly therefrom. Mounting block 88 has a vertical slot 90 on one side and a vertical opening 92 on another side. A pair of threaded openings 94 and 96 extend through the block at a position between slot 90 and opening 92. Wire spring 98 is mounted in mounting block 88. Wire spring 98 is generally U-shaped, having a short leg 100 on one side and a long, resilient leg 102 on the other side. A handle 104 is formed at the upper end of longer leg 102. Just below the handle a cam surface 106 extends at a downward and inward angle from handle 104 and then a latch formed by a generally horizontal portion 108 extends outwardly into contact with the upper end of leg 102. Wire spring 98 desirably is formed of a spring wire that is resiliently deflectable. Preferably the wire used is about 0.090 inches in diameter and is formed from spring steel.

As shown in FIG. 6, short leg 100 of the wire spring fits upwardly through opening 92, while longer leg 102 fits in slot 90, with a bottom portion 110 of the spring being positioned below mounting block 88. Surfaces 106 and 108 form a latch member 112.

The spring is mounted on the mounting plate by means of a C-shaped mounting block 114. Mounting block 114 comprises a vertical portion 116 with outwardly extending upper and lower flanges 118 and 120. Upper flange 118 has one threaded hole 122 and a slightly enlarged non-threaded hole 124 therethrough. These holes are aligned with holes 96 and 94 respectively. Screws 126 and 128 fit through openings 122 and 124 and are screwed into threaded openings 96 and 94, with the screw 126 also being threaded into threaded hole 122. Screw 128 slides freely through non-threaded hole 124.

Lower flange 120 has a slot 130 therein that fits over and retains bottom portion 110 of the spring against a front wall of the truck bed.

The mounting block is used for the purpose of providing a height adjustable mounting of wire spring 98. With the wire spring mounted in the mounting block, screw 128 (an adjustment screw) is first positioned through opening 124 and threaded all the way through opening 94 until the lower end of the screw bears against an upper surface of flange 120. By continuing to advance the screw downwardly through threaded opening 94, the C-shaped mounting block is pushed downwardly by the adjustment screw, thus lowering the position of latch member 112. When a desired elevation is reached, screw 126 is threaded into holes 122 and 96, and this has the effect of locking the mounting block at a desired elevation.

As shown in FIG. 7, the latch member 112 of the wire spring latch 98 releasably locks the front edge of panel 32 in a downward position. This is accomplished by means of a latch plate 132 that is screwed or riveted on the front edge of panel 32. Latch plate 132 has a projection 134 extending forwardly therefrom into alignment with latch member 112 of the wire spring latch. Projection 134 has a cam surface 136 on a lower surface that engages cam surface 106 on latch member 112 when the front panel is closed. This forces the latch member out of the way until the projection passes the latch member, at which time the latch member springs back into a locking position, with surface 108 being positioned above projection 134 and locking the front edge of the front panel downwardly against the upper edge of front wall 20. By appropriate adjustment of the C-shaped mounting block, the position of the wire spring latch can be adjusted vertically so that surface 108 snugly abuts projection 134 when the front panel is fully closed.

In operation, the front panel can be closed and latched simply by slamming it shut. This cams the latch member out of the way and then the latch member automatically returns to lock the panel in place. To release the front latch, handle 104 is simply pivoted outwardly to slide the latch member off the projection.

The L-shaped mounting plate 82 of the front latch mechanism serves a dual purpose. As shown in FIGS. 2 and 6, a rear edge 140 of leg 84 extends rearwardly from front wall 20 of the bed, thereby providing a projection that extends rearwardly at the top edge of the front wall. A conventional key locking mechanism 142 is positioned in front panel 32 immediately adjacent edge 140 of the L-shaped mounting plate. The locking mechanism comprises a key actuated vertical shaft 144 that is rotatably mounted in the panel and extends downwardly below the panel. A lock member 146 extends outwardly from the vertical shaft and is rotatable with the shaft. When lock member 146 is rotated toward front panel 20, the lock member fits snugly under overhanging edge 140 of the L-shaped mounting plate, thus locking the front panel down. With locking member 146 in its Rocking position, even if the wire spring latch is released, the front edge of the panel will remain locked in position. With the locking member 146 pivoted out of alignment with edge 140, the front edge of the panel can be raised and lowered.

Another desirable feature of the present invention is that a locking mechanism is provided for locking down the cover at one or more intermediate panel joints along the side of the cover. One locking mechanism 150 is shown in FIGS. 13–15. This is mounted at a junction of the panels wherein the panels fold downwardly and inwardly toward each other, with the junction between the panels rising upwardly as the panels fold. A mounting bracket 152 is attached by rivets or the like to front edge of panel 28 adjacent the side of the panel. Mounting bracket 152 has a tubular portion at an upper end that is oriented transversely. A spring pin 156 fits in an opening 158 in tubular portion 154 and extends outwardly therefrom to an outer end 160 positioned over the edge of side panel 18. A C-shaped clip 162 is attached to sidewall 18 so as to be in alignment with wire member 156 when the panel is closed. The upper surface of clip 162 acts as a cam when the panel is closed, forcing the spring clip sideways when the panel is closed. When the wire clip moves downwardly below the C-clip, it springs back into the C-shaped interior of the clip, locking the panel thusly down to the sidewall of the pickup truck bed.

To release the clip, outer end 160 is deflected outwardly from under C-clip 162. Alternatively, since the open side of the C-clip faces forwardly and the clip is attached to the rearmost panel, when the panels are raised and pivoted forwardly, this autormatically moves tubular member downwardly and away from clip 162, thus freeing the clip without having to actually disengage the spring member. This movement is shown in FIGS. 14 and 15.

It should be understood that the tubular portion 154 can extend all the way across the panel so that the panel will have a rounded bead at the top edge of each panel. As shown in FIGS. 2 and 14, with the panel joints that pivot in the other direction (i.e. the panels pivot upwardly) the hinge and the seal over the hinge forms a ridge or raised portion at the panel joint. Bead 154 produces a similar raised portion on the panels that pivot in the opposite direction, thus providing a consistent raised ridge at the junction of every panel.

A locking mechanism for locking the panels down also can be positioned on the underside of the panels. As shown in FIGS. 8, 9, and 11, a movable latch mechanism 164 is mounted on the underside of rear panel 26 and is actuated by a spring biased plunger 166 that is accessible at the rear edge of panel 26. The latch member comprises a pair of cam latch members 168 interconnected by a movable linkage 170. The latch members engage latch plates 172 attached to the inner side edges of the inner walls of the truck bed.

Latch plates 172 are mounted in a manner similar to hinge support 48. A U-shaped clamp 174 fits through an opening 176 in the inner sidewall 178 of the truck bed. An L-shaped flange 180 having a downwardly extending leg 182 and a horizontal leg 184 is clamped in place by clamp 174, with leg 182 being positioned adjacent wall 178, and the clamp having a set screw 186 that clamps leg 182 against wall 178. The inner edge of leg 184 engages latches 168. As shown in the exemplary embodiment, latches 168 are attached to a cross-link 170, which is pivotally mounted to the underside of panel 26 by a pin 190, so that the linkage and latches are pivotally mounted in the plane of the panel. Link arm 170 slides through a given range of movement in slots in mounting blocks 192 that are attached to the underside of the panel. Plunger 166 is attached by an arm 196 to linkage 170. A spring 198 biases the plunger in an outward direction and the linkage clockwise (FIG. 8). Thus, depressing plunger 166 rotates linkage 170 in a counterclockwise direction, but it returns to its rest position when the plunger is released.

As shown in FIGS. 11a and 11b, latches 168 have a cam surface 200 thereon and a flat upper surface 204 that is spaced away from panel 26. The flat upper surface constitutes the upper surface of link 170, while cam surface 120 is formed on a nylon member 206 attached to the underside of the link at the outer end.

The latch plate 172 is mounted on the inner sidewall at a position such that cam surface 200 strikes the latch plate when the rear panel is closed. This cam action pivots the linkage in a clockwise direction until the latch member can fit completely under leg 184, locking the rear panel downwardly. The latches 168 at opposite ends of linkage 170 have oppositely facing cam surfaces 200, so that engagement of these latching surfaces with latch plates 172 causes rotation of the linkage in the same direction for locking purposes.

To unlock the latch, plunger 166 is depressed, which rotates the latches out from under legs 184 of the latch plate.

It should be understood that a wide variety of latches could be designed to accomplish this purpose. The latches do not need to rotate but instead could both slide in one direction, laterally or transversely. The significant feature is that latches on both sides of the truck bed are latched simultaneously and are unlatched simultaneously by actuation of a single plunger with the plunger preferably being on a side of the truck bed adjacent the drivers side of the vehicle.

With the under panel latch mechanism as described, the rear panel is automatically latched down whenever the rear panel is closed, and it can be unlatched simply by depressing the convenient plunger at the rear edge of the panel.

In a similar manner the front edge of panel 28 adjacent the junction between panels 28 and 30 can be latched in place automatically whenever rear panel 26 is closed. As shown in FIGS. 8, 10, and 12, a slide latch 210 on each side of the underside of panel 28 is slidably mounted for longitudinal movement in mounting blocks 212. One end of latch 210 is a latch member 214 that fits under an arm 184' of a latch plate 172' that is mounted on the inner sidewall of the truck bed adjacent the junction between panels 28 and 30. Latch plate 172' is the same construction as latch plate 172 but is simply mounted in a different location. Like parts are given the same number but are primed.

Latch 210 extends rearwardly from panel 28 a short distance and then has an upwardly extending tab 216 that extends between the adjacent edges of panels 26 and 28. A spring 218 for each latch urges the latch rearwardly to an unlatched position. When panel 28 is open, the spring automatically urges the latch rearwardly and unlatches latch 214 from latch plate 172'. This occurs automatically and makes it possible to raise panel 28 whenever panel 26 is opened. Thus, the panels can automatically be folded together without having to manually unlatch latch 210. When panel 26 is closed, however, the edge of panel 26 engages tab 216 on each of latches 210 and slides these latches into locking position. Thus, when panel 26 is closed, latch 210 is automatically latched, holding the junction between panels 28 and 30 downwardly on the side edges of the truck bed.

Another feature of the present invention is the manner in which the panels themselves are formed. As shown in FIG. 8, the panels are formed of flat rectangular members formed of fiberglass, honeycomb, or other building material. The edges of the panels are framed or enclosed by channel shaped frame members that cover the edges and the top and bottom of the panel adjacent the edges.

In the present invention, the frame members are formed to incorporate other functions as well as simply framing the panels. As shown in FIG. 20, the interior portion 220 of panel 28 (which is the same as all the other panels) is framed on the edge by a special edge extrusion 222. Edge extrusion 222 has upper and lower flanges 224 that fit adjacent the upper and lower surfaces of the edge of the panel. The edge extrusion, however, has a downwardly and outwardly curved portion 226 that extends away from the panel and arcs downwardly over the sidewall 18 of the pickup truck bed. A lower surface 228 is preferably formed at a slight downward and outward incline of about 4 degrees, although this is not critical. A seal 230 formed of rubber or similar material is positioned on the upper edge of the pickup truck bed or on the underside of surface 228 to provide a water tight seal between the panel and pickup truck bed. A separate tubular seal 229 also can be used. By using an edge extrusion having the downwardly and outwardly sloped shape 226 as shown, the need for side wind baffles of the type used in other covers is eliminated. The extrusion typically has an opening 234 therein for material conservation and weight reduction purposes.

The extrusion of the edge frame also can incorporate the hinge of the present invention. As shown in FIG. 19, each U-shaped extrusion 240 is formed with a cylindrical tubular ridge 242 at one corner thereof. Portions of the tube are cut away so as to form the shape of a hinge tube. These hinge tubes can fit together and be locked together by hinge pin 244. Thus, the edge extrusion of the panel can be formed so as to incorporate the structure of the hinge itself, and it is not necessary to provide a separate hinge that needs to be riveted to the side of the panel. This provides considerable savings in material and assembly costs.

The manner in which the junctions of the panels are sealed is shown in FIGS. 16–18. Rather than incorporating a seal into the hinge mechanism itself, where it cannot be removed or replaced if it is damaged, the seal for the hinge joint of FIGS. 16a and 16b comprises a flat seal 250 formed of a sheet of elastomeric material, preferably with a raised center ridge. This seal is connected by an adhesive 252 to upper surfaces 254 of adjoining panels wherein the hinge axis pin is positioned at the upper edge of the panels. The adhesive can be coated on the underside of the seal and protected before use by release paper; or the adhesive material can be applied at the time that the seal is applied.

When the hinge pin is positioned at the bottom edge of the panels, as shown in FIGS. 17a and 17b, an adhesive seal 256 can be attached by adhesive 258 to the side edges of the panels and a fold 260 of extra material can be provided between the panels in order to provide sufficient seal material to permit the panels to pivot to a wide open position as shown in FIG. 17b.

Another type of seal for panels wherein the hinge pin is located at the bottom of the panels is shown in FIGS. 18a and 18b. The seal is an elongated resilient member 262 having an enlarged tubular or cylindrical head 264 on the top and leg flange 266 extending downwardly. The leg flange has adhesive 268 on one side and is affixed to the edge of a panel, with the leg substantially filling the gap between the panels when the cover is closed. The enlarged head 264 is positioned just about the panel surfaces so that it bridges the gap between the panels and seals the gap from moisture. Desirably the bead is positioned at the junction so it engages both sides of the gap when the cover is closed. In addition to keeping out water, the seal creates a raised ridge above the panel surfaces that is similar to the raised ridges created by the hinges on adjacent panels, wherein the hinge pin is at the top of the panel, this giving the cover a consistent appearance from panel to panel.

It should be understood that the foregoing are merely exemplary of the preferred practice of the present invention and that various changes and modifications may be is made in the arrangements and details of construction of the invention without departing from the spirit and scope of the present invention, as defined in the appended claims.

I claim:

1. In a foldable cover for a pickup truck bed wherein a plurality of hinged panels extend across the bed and rest on upper edges of sidewalls of the bed, the panels including a rear panel and a forward panel adjacent the rear panel, the rear panel being hinged to the forward panel and pivoting upwardly from a rear edge thereof to fold the rear panel against the forward panel, the improvement comprising an automatic side latch for releasably fastening the forward panel to the sidewalls of the bed, the side latch comprising:

> a movable latch member mounted on the underside of the forward panel for movement between a latched position, wherein the forward panel is fastened down on the sidewall, and a released position, wherein the panel is not fastened to the sidewall;
>
> resilient biasing means urging the latch member to its released position;
>
> latch actuator means connected to the latch member for moving the latch to its latched position, the latch actuator means including an actuator member that extends to a position between the rear and forward panels, the actuator member having a released position and an actuated position corresponding to the released and actuated positions of the latch member, the actuator member being engaged by the rear panel and moved to its actuated position when the rear panel is closed, the actuator member being movable to its released position only when the rear panel is not closed, the resilient biasing means urging the actuator member toward its released position when the rear panel is not closed; and
>
> latch engagement means on the pickup truck bed for engaging the latch member and thereby fastening the forward cover down on the sidewalls of the bed when the latch member is in its latched position.

* * * * *